US010947856B2

(12) United States Patent
Grainger et al.

(10) Patent No.: US 10,947,856 B2
(45) Date of Patent: Mar. 16, 2021

(54) AXIAL TURBINE

(71) Applicant: Intelligent Power Generation Limited, London (GB)

(72) Inventors: John Grainger, London (GB); Geoffrey Smith, London (GB); Tristram Bracey, Hove (GB)

(73) Assignee: Intelligent Power Generation Limited, London (GB)

(*) Notice: Subject to any disclaimer, the term of this patent is extended or adjusted under 35 U.S.C. 154(b) by 57 days.

(21) Appl. No.: 16/335,450

(22) PCT Filed: Sep. 22, 2017

(86) PCT No.: PCT/GB2017/052850
§ 371 (c)(1),
(2) Date: Mar. 21, 2019

(87) PCT Pub. No.: WO2018/055403
PCT Pub. Date: Mar. 29, 2018

(65) Prior Publication Data
US 2020/0018175 A1   Jan. 16, 2020

(30) Foreign Application Priority Data

Sep. 23, 2016  (GB) .................................. 1616239
Feb. 17, 2017  (GB) .................................. 1702648
Jun. 12, 2017  (GB) .................................. 1709339

(51) Int. Cl.
*F01D 5/28*      (2006.01)
*F01D 5/30*      (2006.01)
(Continued)

(52) U.S. Cl.
CPC .......... *F01D 5/284* (2013.01); *C04B 35/5935* (2013.01); *F01D 5/03* (2013.01);
(Continued)

(58) Field of Classification Search
CPC ....................................................... F01D 5/03
See application file for complete search history.

(56) References Cited

U.S. PATENT DOCUMENTS 3,015,524 A * 1/1962 Slayter .................. F01D 25/162
                                                      384/117
4,541,776 A * 9/1985 Schon ....................... F01D 5/03
                                                      415/109
4,707,978 A * 11/1987 Garcia Cascajosa ..... F02C 3/16
                                                      60/39.35

FOREIGN PATENT DOCUMENTS

DE        2353551 A1      5/1974
DE        2458268 B1      3/1976
(Continued)

OTHER PUBLICATIONS

Kyocera Press Release (Year: 2009).*
(Continued)

*Primary Examiner* — David Hamaoui
*Assistant Examiner* — Brian O Peters
(74) *Attorney, Agent, or Firm* — Kilpatrick Townsend & Stockton LLP; Dean W. Russell

(57) ABSTRACT

A turbine assembly includes an axial turbine with an axially arranged series of rotor sections and an external sheath providing structural support for the axial turbine, wherein the sheath is made from dense silicon nitride. Each rotor section includes an outer ring and rotor blades and the outer rings of the rotor sections connect to form a rotating outer casing, wherein the rotor sections are made from reaction bonded silicon nitride.

15 Claims, 3 Drawing Sheets

(51) Int. Cl.
*F01D 5/03* (2006.01)
*C04B 35/593* (2006.01)

(52) U.S. Cl.
CPC ........ *F01D 5/3084* (2013.01); *C04B 2235/77* (2013.01); *F05D 2300/2283* (2013.01)

(56) References Cited

FOREIGN PATENT DOCUMENTS

| DE | 102011000420 A1 | 8/2012 |
| JP | H0925831 A | 1/1997 |
| WO | 2013113324 A1 | 8/2013 |

OTHER PUBLICATIONS

International Patent Application No. PCT/GB2017/052850, International Search Report and Written Opinion, dated Dec. 14, 2017.
International Patent Application No. PCT/GB2017/052850, International Preliminary Report on Patentability, dated Mar. 26, 2019.

* cited by examiner

AXIAL TURBINE

FIELD OF THE INVENTION

The featured devices are a type of axial turbine comprising ceramic materials.

BACKGROUND

An axial turbine is a rotating machine which extracts useful shaft work from a motive fluid which is supplied to the turbine typically at high pressure and temperature, flowing generally axially along the device. Typical axial turbines use conventional aerodynamics, including stationary (stator) and rotating (rotor) blades (the blades typically being of an aerodynamic design), the stators converting the supplied pressure into swirl velocity and the rotors extracting that velocity due to the aerodynamic blade forces acting through a rotational movement. It is customary that such turbines consist of many stages of alternate rotor and stator sections, and that the rotors are affixed to a rotating central shaft and the stators are affixed to a stationary casing. This conventional layout can be termed an "in-runner", to denote that the inner rotor sections rotate whilst the outer casing is stationary.

PCT application WO 2013/113324 depicts a statorless gas turbine with a rotating casing, with the rotors mounted to that casing instead of being mounted to a central shaft. (In some embodiments therein, a central shaft may be provided as a static fixation member.) This makes it more viable to use ceramic materials in the rotor blades, since it means that whereas hub-mounted rotor blades would be under high tensile stress due to centrifugal force, casing-mounted rotor blades would instead be under compressive stress. Such a layout can be termed an "out-runner", as distinct from the above-described "in-runner" turbine design.

It has been known for many years that engineering ceramics could allow for a very high temperature turbine inlet flow, thereby boosting the efficiency and power density of a power generation cycle. Ceramics are known to achieve good mechanical properties at such high temperatures compared to the metal alloys more conventionally used in turbines, but usage of ceramics in axial turbines is still very rare by comparison largely since they have been difficult to integrate into the front-lines of engine design due to their very different design requirements.

SUMMARY OF THE INVENTION

The invention is according to the accompanying claims.

The invention presents a turbine assembly comprising an axial turbine comprising an axially arranged series of rotor sections, wherein each rotor section comprises an outer ring and rotor blades and the outer rings of the rotor sections connect to form a rotating outer casing, wherein the rotor sections are made from reaction bonded silicon nitride, and a turbine assembly comprising an external sheath providing structural support for the axial turbine, wherein the sheath is made from dense silicon nitride (DSN), wherein the rotor sections are fitted to the inside of the external sheath, and the sheath and rotating outer casing are arranged to rotate together.

Preferably, the axial turbine also comprises an axially arranged series of stator sections, wherein each stator section comprises an inner hub and stator blades and the inner hubs of the stator sections connect to form a stationary shaft, wherein the stator sections are made from reaction bonded silicon nitride.

Because the rotor sections are fitted to the inside of the external sheath, with the sheath and rotating outer casing formed from the connected rotor sections rotating together, when the turbine assembly is in operation the outward centrifugal force is directed out to the sheath, with the result that the operational strain is thus borne primarily by the sheath, which it is able to handle exceptionally well as a result of the mechanical properties of dense silicon nitride compared to reaction bonded silicon nitride. Meanwhile, the rotor sections (and, where present, the stator sections) being made from reaction bonded silicon nitride makes it easier to shape them into the necessary complex shapes required for optimal performance.

The end result is a turbine assembly which can take greater mechanical strain than one formed solely from reaction bonded silicon nitride, but which simultaneously is easier and cheaper to make than one of an equivalent shape but made entirely of dense silicon nitride. Furthermore, since reaction bonded silicon nitride and dense silicon nitride have broadly similar thermal properties, particularly thermal expansion properties, the turbine assembly of the present invention can operate at higher temperatures than (for example) assemblies in which the turbine is clad in a metal sheath.

DETAILED DESCRIPTION

Figure 1:
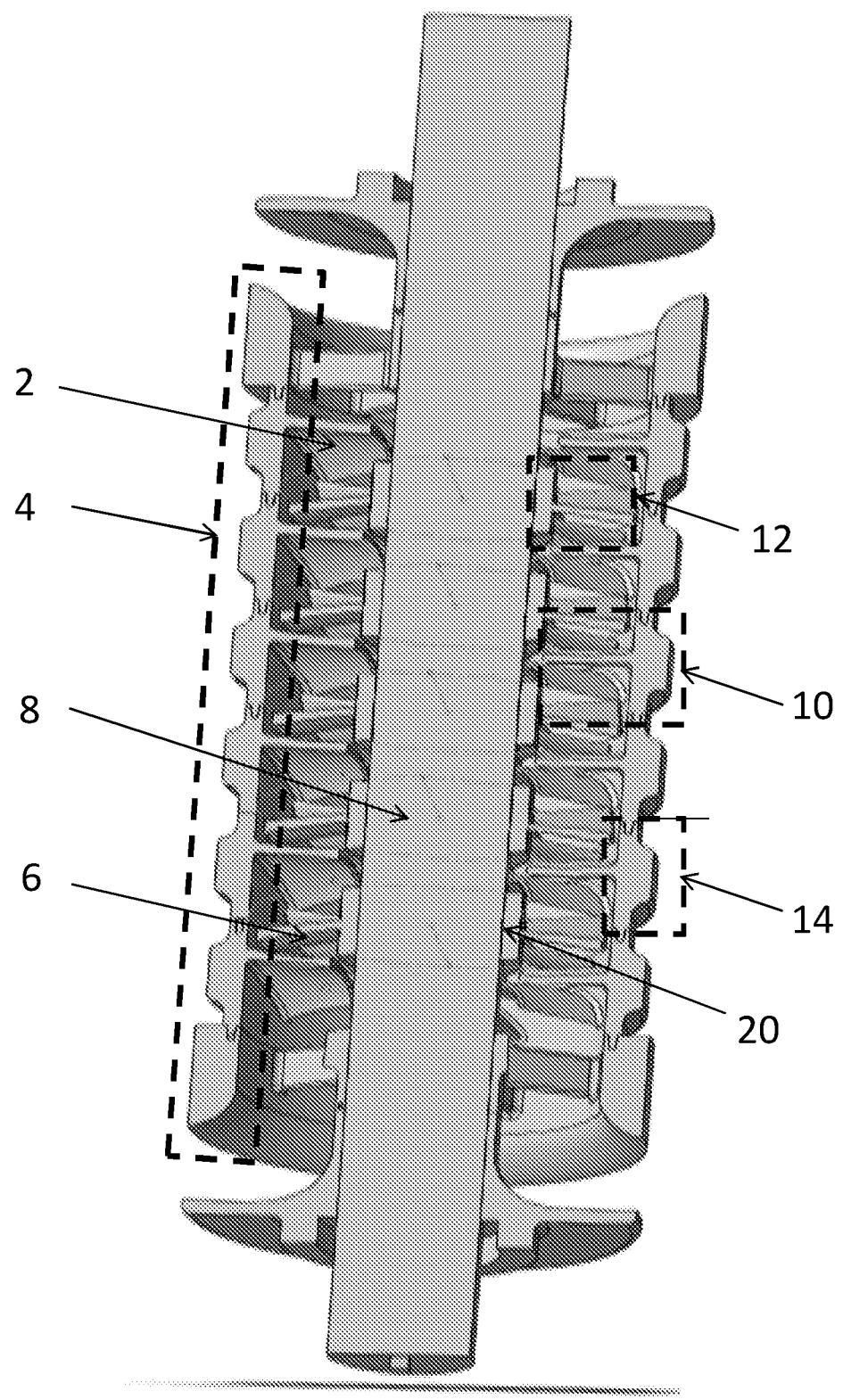
FIG. 1 depicts a cross-section of an axial turbine.

Turbines according to the present invention utilise an out-runner axial turbine design in conjunction with silicon nitride materials. Although turbines produced from ceramic materials are known in the prior art, they have overwhelmingly been in the context of either in-runner axial turbine designs (which have different manufacturing considerations due to the differing stresses on the various components) or radial turbine designs (which are designed on an entirely different basis to axial turbines), and the use of silicon nitrides in an out-runner turbine design is new to the present invention. It has been discovered that a particular design layout in conjunction with silicon nitride materials leads to superior performance and lower cost.

As far as ceramic turbine materials are concerned, one acceptable material is Dense Silicon Nitride (DSN), which commonly refers to a broad class of ceramics composed predominantly of silicon nitride ($Si_3N_4$), usually in beta ($\beta$) hexagonal crystallographic form. The densification is usually achieved by the addition of small amounts of metal oxides to aid the formation of a liquid phase at high temperatures which enables the silicon nitride granules to re-arrange under applied pressure and temperature to densify by liquid phase densification (ref Kingery W. D., Bowen H. K., Uhlmann D. R., "Introduction to Ceramics", pub. John Wiley & Sons. ISBN 0-471-47860-1). Commercial DSN ceramics would be expected to have a density above 96% of the theoretical density. High temperature mechanical performance is generally controlled by the sintering aids used to help densify the ceramic. The use of more refractory glasses, minimal quantities of sintering additives (typical when the ceramic densification is assisted by the application of pressure at high temperature) or the post fabrication devitrification of the intergranular glass all improve the resistance to creep at elevated temperature. Included in this class of ceramics is PSSN (pressureless sintered silicon nitride), SSN (sintered silicon nitride), HPSN (hot pressed silicon nitride), GPSN (gas pressure sintered silicon nitride), HIPSN (hot isostatically pressed silicon nitride), and SPSSN (spark plasma sintered silicon nitride). Examples of suitable ceramics include, but are not limited to, SN282 and SN240 as provided by Kyocera Ltd, NT154 as provided by Coorstek Ltd, and Gas-Pressure-Sintered Silicon Nitride (GPS-SN) as provided by FCT Ingenieurkeramik GmbH.

Another suitable class of materials is that of Sialon ceramics. Sialon ceramics may be considered a subset of the dense silicon nitride ceramics. The commonly exploited ceramics being generally an expanded beta (β) hexagonal $Si_3N_4$ lattice with the formula $Si_{6-z}Al_zO_zN_{8-z}$, where z is typically greater than 1.5 (but can be expanded to over 4). It is usual to achieve densification by the addition of combinations of metal oxides or other appropriate liquid sintering aids. Sialon ceramics differ from the dense silicon nitride ceramics described above in the extent of the lattice distortion that is achieved by incorporation of some of the cations from the densification aids within the silicon nitride lattice.

Another suitable material that can be regarded as a type of dense silicon nitride is Sintered Reaction-Bonded Silicon Nitride (SRBSN). This is a type of reaction-bonded silicon nitride (RBSN) as described below which has been subjected to a sintering process; in the production of this metal oxides are added to the starting Si metal powder as sintering aids. Thus after conversion of the Si to $Si_3N_4$ at above 1450° C. it is possible to achieve some densification by increasing the temperature. This is concurrent with shrinkage (typically <10%) and the reduction of porosity. As a result of this sintering, whilst the density of SRBSN is typically below 96% of the theoretical silicon nitride density, at the same time SRBSN has an intermediate density above that of RBSN. As a result, it is suitable for use as a sheath material in turbine assemblies according to the present invention due to having a density in excess of that of the rotor sections produced from RBSN.

As described in the accompanying claims, the turbine assembly of the present invention includes an exterior sheath that structurally supports the rotor sections and is adapted to rotate with them, and is made from dense silicon nitride. Dense silicon nitride materials suitable for this purpose include, but are not limited to, any of the above described dense silicon nitride materials, including Gas Pressure Sintered Silicon Nitride materials, Sialon ceramics and SRBSN, Preferably, the dense silicon nitride material used for the sheath has a density above 96% of the theoretical density. More preferably, the dense silicon nitride material used for the sheath has a density above 98% of the theoretical density.

A variety of fabrication techniques can be used to produce turbine components comprising DSN and Sialons ceramics. The fabrication stages for a component can be considered as Green Formation, Densification and Finishing, described as follows.

Green formation is where the ceramic powder, after mixing with the sintering aids and generally a fugitive binder, are formed into the basic product shape. These include but are not limited to slip-casting, pressure-casting, freeze-casting, injection molding, die pressing and iso-static pressing. A machining step may follow the initial shape formation.

Densification is a process which applied heat and optionally pressure. This may be preceded by a low temperature heat treatment stage depending upon the green formation route used and the formulation. At this stage of the process a linear shrinkage of 18 to 22% is typical.

Finishing is necessary for any surface finishes required other than 'as fired', or to ensure close dimensional tolerances. It is normal to machine the component by diamond grinding or polishing.

For particular components of the claimed invention Reaction Bonded Silicon Nitride (RBSN) is used. Reaction Bonded Silicon Nitride (RBSN) is unique amongst ceramics and differs from dense silicon nitrides (DSN) both in formation route and in the fact that RBSN is porous (typically having a porosity of 10 to 30%).

One manufacturing method for RBSN is to machine shapes from a suitable silicon solid billet (said billets formed by cold-pressing a suitable silicon powder) prior to conversion to a nitride form via firing in a pure nitrogen atmosphere. Machining in the soft and ductile metal silicon phase greatly reduces the tooling cost compared with diamond grinding in a harder, more brittle ceramic phase. This is much like the "green formation" stage described above. The heating process in the nitrogen atmosphere takes place at over 1450° C. to convert to silicon (Si) metal to silicon nitride ceramic. The conversion process results in dimensional changes of up to 1%, thus minimising internal stresses and requires little or even no further expensive finishing, nor the difficulty of compensating for shrinkage. As a result, the nitride heating process causes minimal shrinkage compared with other sintering processes, thus minimising internal stresses, requiring no further machining and little (or even no) expensive further finishing after firing, and the difficulty of compensating for shrinkage is largely eliminated. Alternatively, the silicon material (such as silicon powder) can be injection moulded, and due to the low shrinkage again requires no or very little further machining after firing.

The Si metal powder metal compact can be sintered to enable final shapes to be produced by conventional metal machining processes (instead of diamond grinding). 'Green shapes' can be readily prepared by flame/plasma spraying. Negligible glass is present in the finished ceramic (as opposed to metal oxide additives being used during the formulation and fabrication), thus improved high temperature creep resistance is expected. The primary application limitation results from the residual open porosity which is susceptible to corrosion or oxidation depending upon the local atmosphere. As a result, RSBN, tends to have inferior mechanical properties to higher density silicon nitrides such as those formed by sintering, which generally have far greater manufacturing costs due to expensive grinding and more process steps (necessitated by the greater degree of shrinkage), or otherwise the substantial cost and time of adjusting injection moulds to correctly compensate for shrinkage. As such, RSBN is thus more viable for parts with higher part complexity compared with DSN, provided that allowance is made for their potentially inferior mechanical properties. In the context of the present invention, the rotor sections and (preferably) the stator sections are made from RBSN.

The broad category of materials defined as silicon nitride encompasses but is not limited to Dense Silicon Nitrides, Sialon materials, RBSN, and SRBSN (wherein Sialon materials and SRBSN are types of dense silicon nitride). These all share similar thermal expansion properties, high strength (and capacity to withstand force or pressure) and creep resistance at high temperatures relative to metals, and good thermal shock properties relative to other ceramics. As widely cited with most ceramics, silicon nitride materials are far better at resisting compressive loading than tensile loading. As described above, in the present invention the rotor sections and preferably the stator sections are produced from RBSN, whilst the sheath is produced from dense silicon nitride (potentially including SRBSN or Sialon materials).

Figure 2:
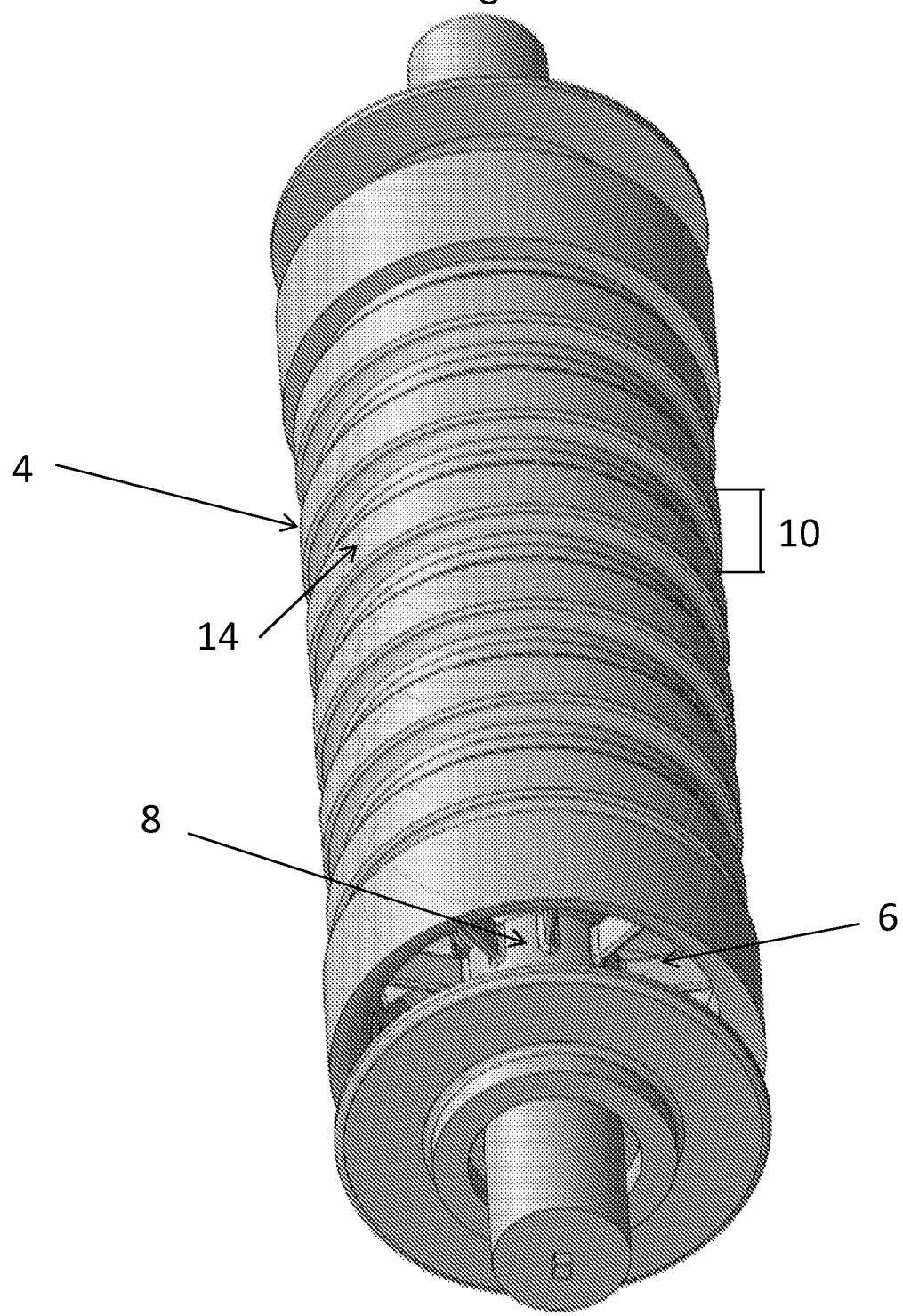
FIG. 2 depicts an exterior view of the axial turbine of FIG. 1.

Unlike conventional in-runner axial turbines, which use rotor blades attached to a rotating shaft with stator blades attached to the surround casing, the turbine depicted in FIGS. 1 and 2 reverses this by attaching the rotor blades 2 to outer rings 14 which connect to form an outer casing 4 which all rotate together, and attaching the stator blades 6 to a shaft 8 which does not rotate, and is therefore a type of out-runner turbine.

Figure 3:
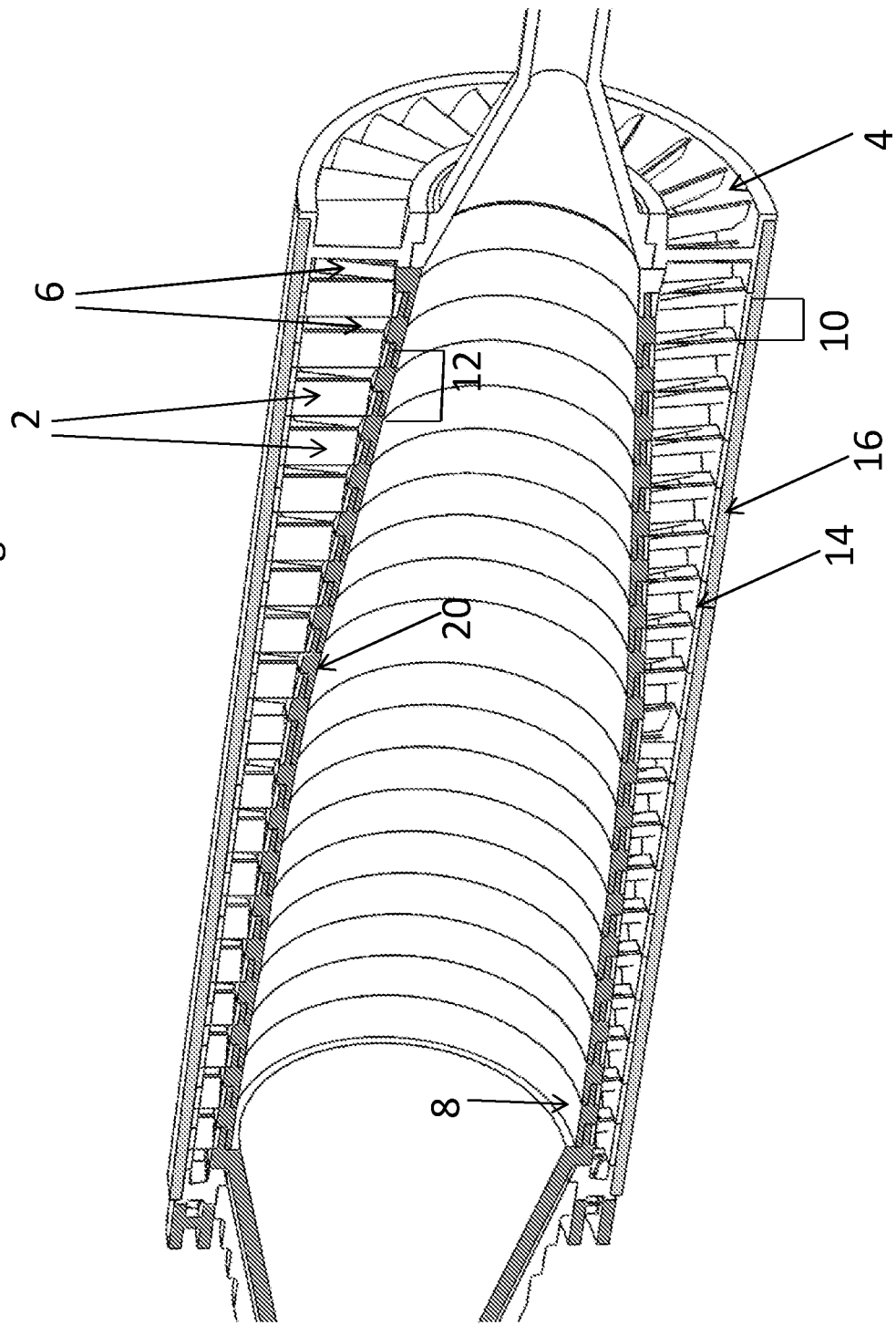
FIG. 3 depicts a cross-section of another axial turbine, depicting the sheath feature.

The turbines in FIGS. 1 to 3 comprise rotor sections 10 and stator sections 12. The rotor sections comprise aerodynamic rotor blades 2 are positioned radially inside an outer circular ring 14. In one embodiment of the present invention, as depicted in FIGS. 1 and 2, when fitting adjacent rotor sections 10 together, the outer rings 14 connect to form a continuous outer cylinder or casing 4. In an alternative embodiment of the present invention, as depicted in FIG. 3, a separate sheath 16 is also provided, and the adjacent rotor sections 10 are fitted to the inside of said sheath 16, the outer rings 14 connecting to form a continuous cylinder 4 inside the sheath 16; where this embodiment is used, the assembly is preferably cylindrical to make grinding the inner diameter of the sheath 16 easier. The rotor sections 10 and the casing 4 and, where present, the sheath 16 all rotate together. (Other turbines according to the present invention could have a different tubular form to the casing, such as a conical shape, optionally with some axial variation in thickness.)

Space is left between the rotor blades 2 for the stator blades 6. The stator sections 12 comprise the stator blades 6 comprised on an inner hub 20. The inner hubs 20 of the stator sections 12 fit together to form the shaft 8 which is locked from rotation. (The shaft 8 may be locked from rotation by the casing 4). Typically, the process of assembly involves placing the rotor sections 10 and stator sections 12 alternately, to form two concentric assemblies with blades.

In some embodiments of this invention, rotor sections 10 and stator sections 12 are formed as monolithic pieces, each incorporating many blades—typically 20 to 60. Alternatively, some embodiments of the invention may allow for the attachment of individual blades, or the attachment of an assembly of a small number of blades, to a common hub for ease of manufacture.

In some embodiments of this invention, rotor rings 14 and/or stator sections 12 incorporate a form of keyway or other non-planar interface to mutually transmit torque, rather than relying on friction from the fitting of the casing 4 or the sheath 16.

The arrangement of a stationary shaft 8 and a rotating outer assembly, means that in operation a compressive centrifugal force operates on the rotor blades 2, rather than putting them under tension as they would be if mounted on a rotating central shaft as in a conventional turbine.

This is preferable if producing rotor blades 2 from ceramic materials, since ceramics tend to be more prone to fracture and creep when under tension. The placement of the rotor blades 2 on the outer casing 4 therefore reduces the mechanical demands on the rotor blades compared with a conventional arrangement.

Under the rotational loading, the casing 4 is in tension, which permits for a much simpler blade geometry to be used and hence a superior structural efficiency—that is, in operation a greater proportion of the turbine approaches the maximum limit for allowable stress, so that no material is needlessly operating below capacity. The simpler blade geometry also means that there are no stress concentrations as would be typical in more complex geometries. Such geometries are also simple inexpensive to produce and grind to a smooth finish, minimising the effect of surface flaws in potential crack initiation.

These features (placement of the rotor blades 2 on the casing 4 and having the casing under tension) allow the blades to be spun at higher speeds, increasing the stage work and thus reducing the number of stages, and hence weight, required for the same power (i.e., the power to weight ratio is improved), with consequent benefits for material cost. It also allows the same aerodynamic load to be obtained from thinner blades—perhaps as little as 1 mm thick—allowing the use of more blades per stage. Higher blade counts provide an optimal ratio of blade axial length to pitch when coupled with a reduced axial length, so using thinner blades reduces the overall length and weight of the turbine without affecting efficiency, which is particularly useful for vehicle applications.

Torque can be extracted from the rotating portions of the turbine in various ways, including but not limited to belts or gears attached to the rotating portion, or cantilevering the stator shaft 8 at one end and connecting the rotor back to a rotating shaft at the other end and/or back through the stator assembly, or having the stator assemblies as two separate cantilevers meeting in the middle, allowing the middle rotor stage to connect to a rotating central shaft which passes through both the stators.

Optionally, the outer rings 14 of the rotor sections 10 and/or the inner hubs 20 of the stator sections 12, may comprise shrouds to limit tip leakage. Optionally, shrouds may instead be provided by the provision of additional ring and/or hub sections designed so as to interface with the rotor sections 10 and/or stator sections 12, or provided on the rotor sections 10 and/or stator sections 12 by incorporating an additional ring attached to and connecting together the inside of the rotor blades or outside the stator blades. This limits tip leakage and annular losses and provides additional structural stiffness to the blades.

Either of the rotor sections 10 or stator sections 12 may or may not facilitate annular flare of the flow path, thereby creating conical assemblies, as is customary to retain a constant axial velocity as the flow reduces in pressure through the turbine.

The rotor sections 10 and stator sections 12 are made from RBSN, which can be cheaply manufactured despite possessing a complex geometry.

Optionally, the outer casing 4 or sheath 16 can be cooled externally to reduce the ceramic operating temperatures, provided that the resulting thermal stress does not offset this benefit. Conventional axial turbines use cooling via microchannels embedded in the blades; providing exterior cooling to the outer casing 4 or sheath 16 instead means that the rotor blades 2 and stator blades 6 do not require such channels, thus simplifying the design considerations and manufacturing process.

Optionally, a sheath 16 manufactured from a higher strength material may optionally slide on outside the said rotor sections 10 (or, as in the embodiment of FIG. 3, have the rotor sections 10 fitted to it as part of the assembly process), thereby adding substantial strength by resisting the centrifugal load in tension. Preferably, this sheath 16 is cylindrical to make grinding the inner diameter easier. Other conical forms may also suffice in this role, adding cost but allowing the annulus to flare outwards in the latter stages, being aerodynamically preferable.

The sheath material will preferably but not necessarily have similar thermal-mechanical properties to the material from which the rotor sections 10 are produced; where the rotor sections are produced from RBSN, the sheath material is produced from dense silicon nitride as described above; examples of suitable dense silicon nitride materials include (but are not limited to) ceramics such as Silicon Nitride 282 (SN282) as provided by Kyocera, NT154 (as provided by Coorstek), Sintered Silicon Nitride (SSN), Gas-Pressure-Sintered Silicon Nitride (GPS-SN), or High Gas-Pressure-Sintered Silicon Nitride (HGPS-SN). In a comparative example the sheath 16, could be formed from metals, whether high temperature metals such as nickel alloys or high strength metals such as rolled steels, or various graphite based materials, possibly with an insulating inner layer or suitable cooling strategy (if a metal casing is used, the sheath 16 will typically be made out of nickel alloys). Metal cylinders and cones are easy to manufacture, so could also be suitable for the casing if using a suitable interference fit to compensate for differential thermal expansion. In a comparative example various graphite based materials may also work in role either as a rotor section or sheath without departing from the scope of the invention herein described. Where a sheath 16 is used, the higher strength material comprised in the sheath would generally be chosen to have superior, more reliable and/or better documented mechanical properties, thus being more capable of taking tension than the rotor hub components. The advantage of making both the rotor sections and sheath out of silicon nitride materials as in the present invention, compared to these comparative examples, is that the thermal properties of both RBSN and dens silicon nitride will tend to be similar enough to greatly reduce or eliminate any issues arising from differential thermal expansion.

The placement of the rotor blades 2 inside the casing 4 (and, where used, the sheath 16) and having their combined assembly rotating allows the designer to separate the material requirements for the two functions of aerodynamics and structure, allowing for the juxtaposition of different material properties for each.

In turbines according to the present invention, the said form of out-runner arrangement using rotor rings (i.e. the casing) must be present, and in addition that at least one of the rotor sections 10, the stator sections 12, or the casing 4 or, where present, the sheath 16 are made from silicon nitride. In some embodiments, combinations of materials may be used for the casing 4, rotor sections 10, or stator sections 12, or (where present) sheath 16 these combinations comprising any form of silicon nitride with any other materials.

Since the sheath 16 need only be a simple shape such as cylinder or cone, perhaps with some taper in thickness, the grinding costs for materials such as SN282 or GPS-SN or other dense silicon nitride materials are much lower than would be the case for the highly complex aerodynamic blade shapes since grinders can be easily inserted axially along the internal faces, using less specialist grinding tools and using fewer machine axes. Accurate measurements of the sheath inner diameter can be used to grind the rotor hub outside diameters to suit, thereby taking advantage of the ease of grinding an outside diameter and in the generally weaker of the two materials, thereby reducing the cost of grinding.

The use of RBSN rotor pieces which may be cheaply manufactured despite possessing a complex geometry, arranged to favour compression, alongside a geometrically simple (and hence relatively low-cost) sheath comprised of stronger material arranged to favour tension, thus takes advantage of the favourable properties of both materials whilst mitigating the drawbacks.

Optionally, said sheath 16 can be shrink-fit over the rotor section 10 (especially when the rotor section comprises RBSN) by applying a moderate temperature difference during assembly, putting the latter into residual compression and thereby reducing the tensile load in the weaker rotor sections 10 when spinning. Alternatively, the tolerance can be left sliding. In this case, it may be acceptable to allow the rotor hubs, generally the weaker material, to creep until an interference fit forms by itself, rather than machining the necessary fine tolerances before assembly.

Both conventional metal in-runner turbines and the cited prior art out-runner turbines, in order to function at high temperatures, need to be constructed of expensive exotic metal alloys, and either suffer from limited operating temperatures (below about 1,100° C., which limits the power generation efficiency) or else require complex capillary channels to blow cooling air through the blades to retain their mechanical strength. Cooling channels add substantial complexity to turbine blade design and manufacture, add a parasitic compressor load to power the air flow, and cannot be easily fit into the very thin and small blades typical in micro-turbines (i.e. gas turbines with below about 1 MW). The ceramic materials used in the featured novel turbine enable operation at elevated temperatures above 1,100° C. without exotic metal alloys or cooling channels, thus greatly reducing cost and complexity whilst allowing high performance, even for micro-turbines with thin and small blades.

Prior art embodiments of ceramic in-runner axial turbines could in principle work at high temperatures above 1,100° C. without exotic metal alloys or cooling channels. However, since such prior art examples have no equivalent of the silicon nitride sheath 16 to provide structural support, the blades themselves would need to be both structural (taking tensile load) and complex, so they cannot take advantage of the option to combine different silicon nitride materials or manufacturing options, so may be far more expensive and difficult to manufacture.

Despite the best use of silicon nitride materials, in order to ensure the reliability of the ceramics, the turbine according to the present invention requires a lower rotational speed, below 20,000 rpm for power levels below 1 MW, than typical prior designs of the same power, normally above 20,000 rpm. To retain the same power and efficiency, this increases the number of turbine stages, making the turbine axially longer. Since the structural integrity of the turbine can be largely provided by the high-strength sheath 16, extending this over more stages has little impact on cost. Optionally, the sheath 16 can terminate partway down the turbine, since the lower temperature turbine stages may not require as much structural support. Also, the lower speeds and low material density (and hence lower bearing loads) are more compatible with more established bearing options such as ceramic hybrid deep-groove roller bearings as provided by SKF Ltd, rather than more exotic options such as foil bearings or magnetic bearings. The lower speed also reduces bearing losses, noise and vibration.

Optionally, in turbines according to the present invention the rotor can be placed within a vacuum to prevent windage losses and effectively insulate the turbine sheath 16 or outer casing 4, thereby reducing conductive losses and thermal transient stresses in the casing 4 or sheath 16. The vacuum can be sealed towards the bearings via rotating seals, and the vacuum may be need to be maintained via a separate pumping system.

Optionally, turbines according to the present invention can be used in conjunction with a combustor. Optionally, the outside of the turbine can be encircled by an annular combustor, of any appropriate shape and size known to those skilled in the art, which can deliver gases at the right conditions and composition to the inlet of the turbine. Optionally, this combustor can have staggered fuel injection locations such that the temperature gradient axially along the combustor matches that of the turbine as to reduce radial thermal stress on the turbine outer casing or sheath. A combustor of this type reduces the cooling and/or insulating requirements of a turbine cycle, and incorporates two pressure vessels together, reducing the required the quantity of pressure-retaining structure. Optionally, a flameless combustion system (often termed MILD, HiTAC, and FLOX) can be formed via exposure to the high rotation speeds of the turbine rotor, helping the gas velocities to be above the typical flame speeds.

Optionally, turbines according to the present invention can be part of a regenerative turbine cycle which can involve a compressor for the inlet air, a rotating regenerator or heat-exchanging recuperator to transfer heat from the turbine exhaust to the compressed air, a combustor to raise the temperature of the compressed air to the desired turbine inlet conditions and the turbine herein described. Such a cycle including the Turbine is capable of high efficiencies compared to other micro-turbine cycles.

Various embodiments and features have been described above. It should be recognized that these embodiments are merely illustrative of the invention presently claimed and may themselves separately or, in combination, form inventive matter.

The invention claimed is:

1. A turbine assembly comprising:
   i) an axial turbine comprising an axially arranged series of rotor sections, wherein each rotor section comprises an outer ring and rotor blades and the outer rings of the rotor sections connect to form a rotating outer casing, wherein the rotor sections are made from reaction bonded silicon nitride; and
   ii) an external sheath providing structural support for the axial turbine, wherein the external sheath is made from dense silicon nitride (DSN);
   wherein the rotor sections are fitted to the inside of the external sheath, and the external sheath and rotating outer casing are arranged to rotate together.

2. The turbine assembly of claim 1, wherein the axial turbine further comprises an axially arranged series of stator sections, wherein each stator section comprises an inner hub and stator blades and the inner hubs of the stator sections connect to form a stationary shaft, wherein the stator sections are made from reaction bonded silicon nitride.

3. The turbine assembly of claim 2, wherein the axial turbine further comprises at least one shroud comprised in at least one inner hub of the stator sections.

4. The turbine assembly of claim 1, wherein the axial turbine further comprises at least one shroud comprised in the outer ring.

5. The turbine assembly of claim 1, wherein the external sheath is made from dense silicon nitride (DSN) with a density above 96% of theoretical density.

6. The turbine assembly of claim 1, wherein the external sheath is comprised of at least one material selected from the group of silicon nitride 282 and gas-pressure-sintered silicon nitride.

7. A system comprising a turbine assembly of claim 1, a compressor, a combustor, and a regenerator or recuperator.

8. The turbine assembly of claim 2, wherein the axial turbine further comprises at least one shroud comprised in the outer ring.

9. The turbine assembly of claim 3, wherein the axial turbine further comprises at least one shroud comprised in the outer ring.

10. The turbine assembly of claim 2, wherein the external sheath is made from dense silicon nitride (DSN) with a density above 96% of theoretical density.

11. The turbine assembly of claim 3, wherein the external sheath is made from dense silicon nitride (DSN) with a density above 96% of theoretical density.

12. The turbine assembly of claim 4, wherein the external sheath is made from dense silicon nitride (DSN) with a density above 96% of theoretical density.

13. The turbine assembly of claim 2, wherein the external sheath is comprised of at least one material selected from the group of silicon nitride 282 and gas-pressure-sintered silicon nitride.

14. The turbine assembly of claim 3, wherein the external sheath is comprised of at least one material selected from the group of silicon nitride 282 and gas-pressure-sintered silicon nitride.

15. The turbine assembly of claim 4, wherein the external sheath is comprised of at least one material selected from the group of silicon nitride 282 and gas-pressure-sintered silicon nitride.

* * * * *